United States Patent
Coleman et al.

(10) Patent No.: US 9,106,613 B2
(45) Date of Patent: Aug. 11, 2015

(54) REMOTE SELF SERVICE FACILITIES ADMINISTRATION SYSTEM

(75) Inventors: Jason S. Coleman, Longwood, FL (US); Jack Wells Craig, Oviedo, FL (US); Amit Hathiramani, Winter Garden, FL (US); Theresa Heinz, Longwood, FL (US); Deborah A. Spencer, Apopka, FL (US); Rafael Tiles, Sanford, FL (US)

(73) Assignee: NCR Corporation, Duluth, GA (US)

( * ) Notice: Subject to any disclaimer, the term of this patent is extended or adjusted under 35 U.S.C. 154(b) by 628 days.

(21) Appl. No.: 11/764,288

(22) Filed: Jun. 18, 2007

(65) Prior Publication Data

US 2008/0010375 A1    Jan. 10, 2008

Related U.S. Application Data

(60) Provisional application No. 60/814,740, filed on Jun. 19, 2006.

(51) Int. Cl.
*G06F 21/00* (2013.01)
*H04L 29/06* (2006.01)

(52) U.S. Cl.
CPC ........... *H04L 63/029* (2013.01); *H04L 63/0428* (2013.01)

(58) Field of Classification Search
CPC .................................................. G06Q 20/382
USPC ...................................................... 705/50–79
See application file for complete search history.

(56) References Cited

U.S. PATENT DOCUMENTS

| 6,308,887 | B1 * | 10/2001 | Korman et al. | 235/379 |
| 7,870,153 | B2 * | 1/2011 | Croft et al. | 707/781 |
| 2002/0065909 | A1 * | 5/2002 | Han | 709/224 |
| 2004/0139000 | A1 * | 7/2004 | Amos | 705/39 |
| 2004/0250085 | A1 * | 12/2004 | Tattan et al. | 713/186 |
| 2006/0090136 | A1 * | 4/2006 | Miller et al. | 715/734 |
| 2006/0277413 | A1 * | 12/2006 | Drews | 713/189 |
| 2008/0229415 | A1 * | 9/2008 | Kapoor et al. | 726/22 |

* cited by examiner

*Primary Examiner* — James A Reagan
(74) *Attorney, Agent, or Firm* — Peter H. Priest (57) ABSTRACT

Systems and methods are described for automatically providing remote self service facilities administration over an Internet protocol (IP) network or over a direct circuit (DC) network. To such ends, a system provides self service use of services of a provider network remotely from the provider network. A remote site kiosk is places in a remote site network with an Internet connection, the remote site kiosk having encryption support via a remote site tunneling endpoint for communications with the Internet and self service applications which communicate through the remote site tunneling endpoint. A data center with an Internet connection to a provider network and to the remote site kiosk, with encryption support via a data center tunneling endpoint to securely receive and forward communications over the Internet between the remote site kiosk and the provider network.

20 Claims, 7 Drawing Sheets

| Screen Name: | Add Site |
|---|---|
| Purpose: | Allows a supervisor to add a new site record. |
| Content: | |

Add New Site

Logo

Site Name ____ 404

Address ____ City ____ 406

State ____ Zip Code ____ Phone ____

Main Group [Drop Down Menu] Sub Group [Drop Down Menu] — 410
408

City Code [Drop Down Menu] — 412

Account Status ● Enabled / ○ Disabled — 414

Kiosk Name #01: ____ Kiosk #07: ____
Kiosk Name #02: ____ Kiosk #08: ____
Kiosk Name #03: ____ Kiosk #09: ____   416
Kiosk Name #04: ____ Kiosk #10: ____
Kiosk Name #05: ____ Kiosk #11: ____
Kiosk Name #06: ____ Kiosk #12: ____

[Save] — 418
[Cancel] — 419

[Log Out] — 420

REMOTE SELF SERVICE FACILITIES ADMINISTRATION SYSTEM

RELATED U.S. APPLICATION DATA

The present application claims the benefit of U.S. Provisional Application No. 60/814,740, filed Jun. 19, 2006 which is incorporated by reference herein in its entirety.

FIELD OF THE INVENTION

This present invention relates generally to self service systems and procedures and, in particular, to self service Internet administration systems, such as may be advantageously used in airline self check-in, hotel check-in, rental car reservations, and the like.

BACKGROUND OF INVENTION

A common use self service (CUSS) standard was first released in 2003. The CUSS standard specifies how multiple airlines may provide passenger services at a shared self-service kiosk. In order to provide passenger services, such as check-in functionality, the CUSS standard requires a network infrastructure that uses private Internet protocol (IP) networks to each airline's internal network. This requirement for use of private IP networks has made it impractical to extend the check-in functionality for many locations beyond the airport. With a growing number of self-service kiosks located beyond the airport, application management of software applications located on the self-service kiosks also becomes a growing problem.

SUMMARY OF INVENTION

Among its several aspects, an embodiment of the present invention addresses a system for automatically providing remote self service facilities administration over an Internet protocol (IP) network or over a direct circuit (DC) network. To such ends, a system, in accordance with one aspect of the invention, provides self service use of services of a provider network remotely from the provider network. A remote site kiosk is placed in a remote site network with an Internet connection, the remote site kiosk having encryption support via a remote site tunneling endpoint for communications with the Internet and self service applications which communicate through the remote site tunneling endpoint. A data center with an Internet connection to a provider network and to the remote site kiosk, with encryption support via a data center tunneling endpoint to securely receive and forward communications over the Internet between the remote site kiosk and the provider network.

Another embodiment addresses a method for providing self service use of services of a provider network remotely from the provider network. a kiosk is placed in a remote site network with an Internet connection, the remote kiosk having encryption support via a remote site tunneling endpoint for communication with the Internet and self service application which communicate through the remote site tunneling endpoint. A data center communicates over an Internet connection to a provider network and to the remote site kiosk, with encryption support via a data center tunneling endpoint to securely receive and forward communications between the remote kiosk and the provider network.

Another embodiment addresses a method for providing self service use of services of a business service provider remotely from the business service provider. Configuration and software version control information is communicated through a tunneling secure network with a data center, the data center remote from the business service provider. A business service provider is selected from a list of authorized business service providers a user has a remote access to. A remote site self service application is configured to support the selected business service provider in the remote site. Transaction information is communicated under control of the data center between the configured remote site self service application and the selected business service provider.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure to those skilled in the art.

Figure 1:
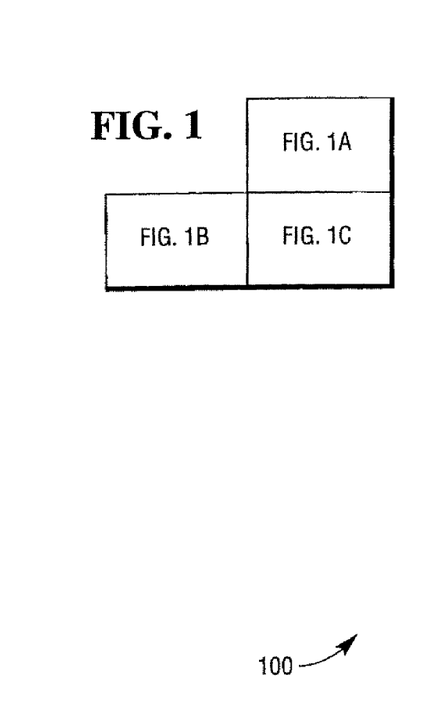
FIG. 1 illustrates a check in system in accordance with one aspect of the present invention.
Figure 1A:
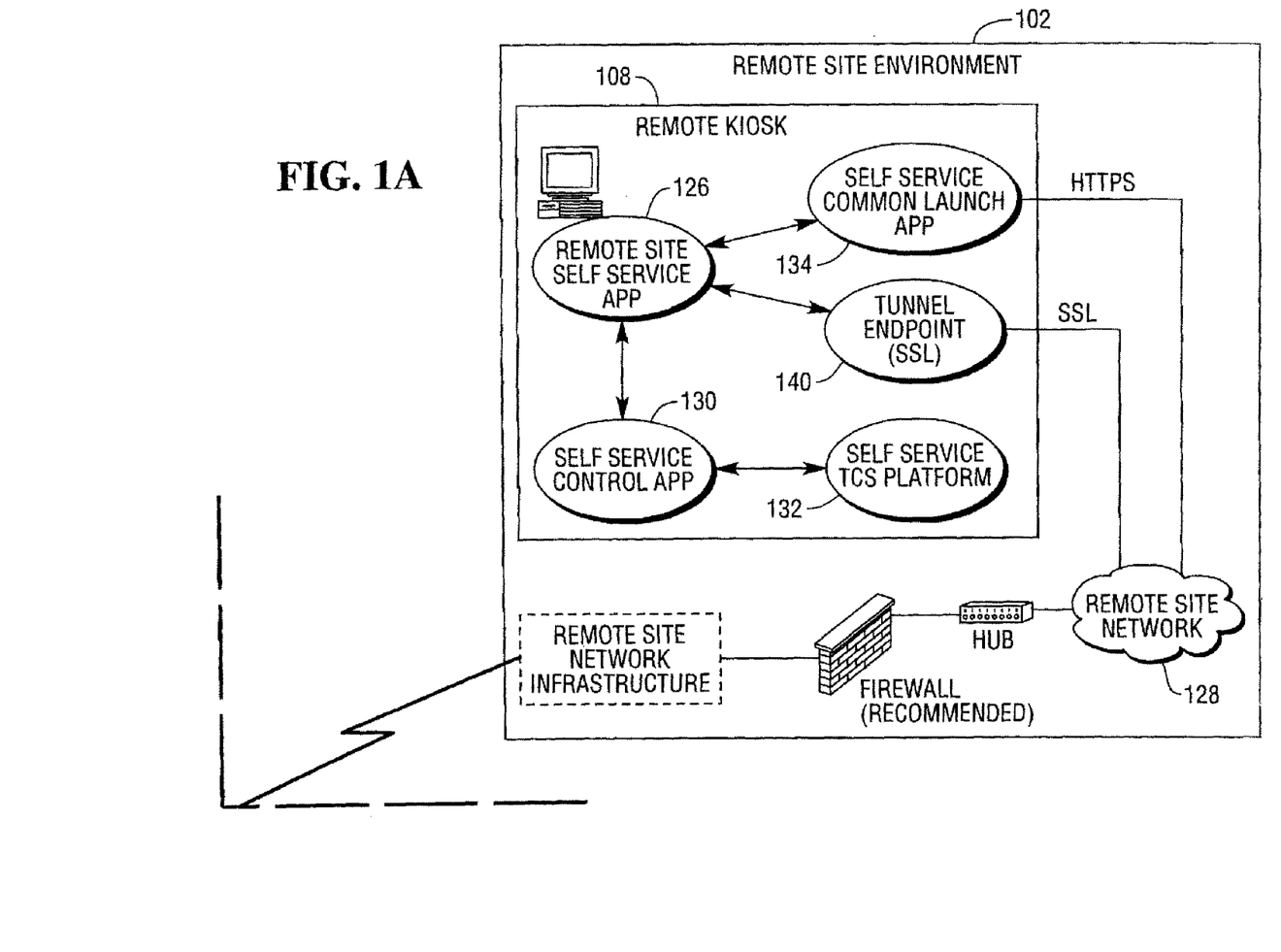
Figure 1B:
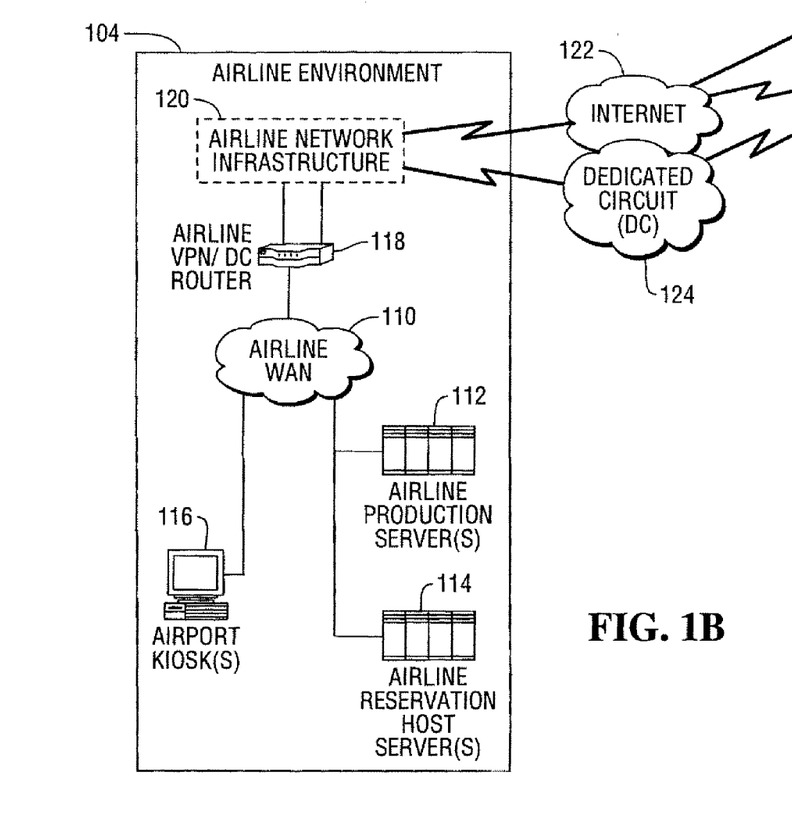
Figure 1C:
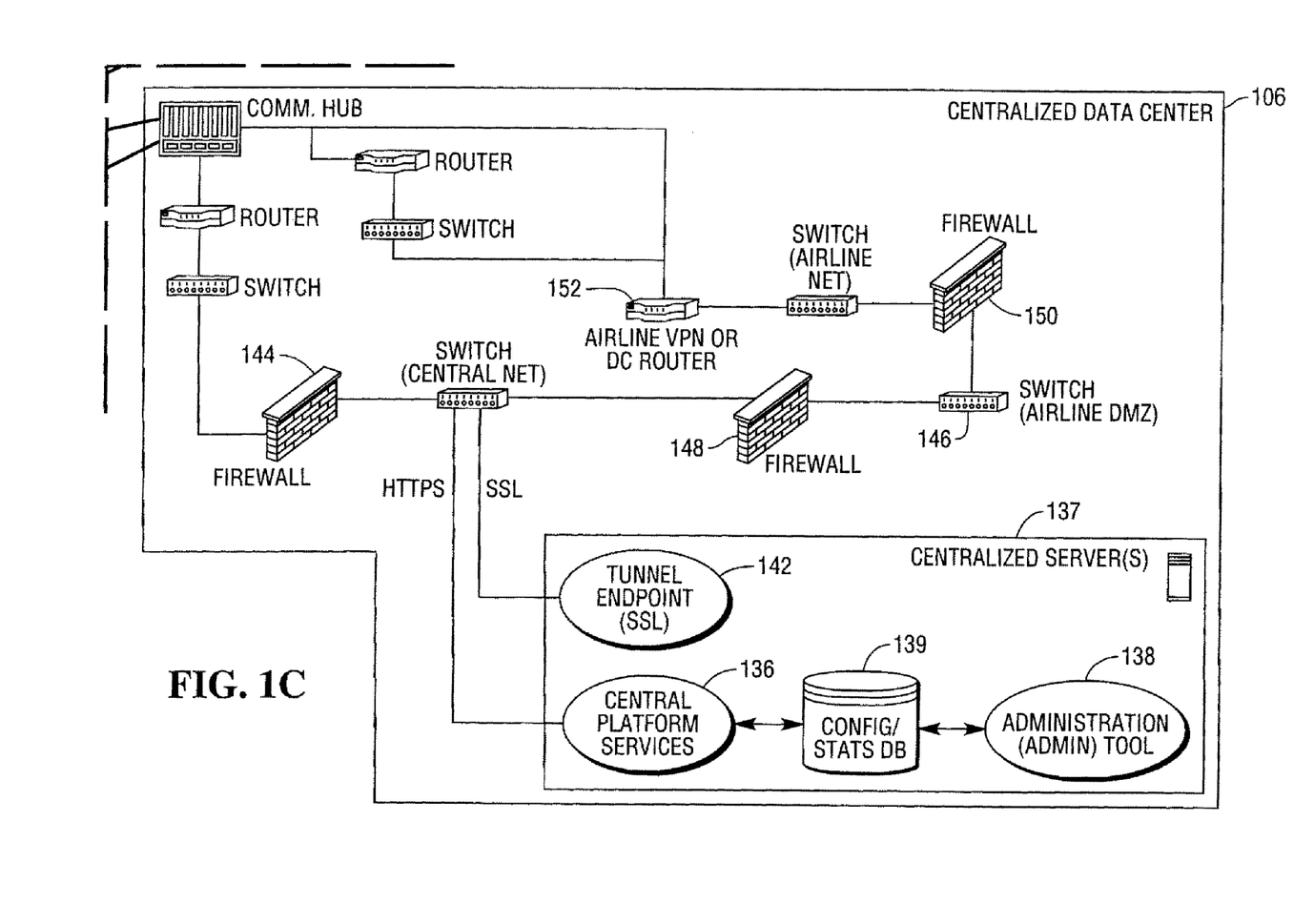

FIG. 1 illustrates a check in system 100.a The check in system 100 runs on an organization of servers, routers, hubs, firewalls, and other electronic equipment, including, for example, a database, database server, and network swithces. A server, for example, is a processing system having one or more processors, memory, input/output units of high capacity and performance, such as, large capacity disk drives and high speed communication devices, and may have a keyboard, a display, and a printer. Server programs, as computer readable media, may be loaded form a disk drive or downloaded through a communication device, for example. Multiple servers are shown in the check in system 100 and each server may be further configured as a cluster of servers to satisfy performance, capacity, and reliability requirement. Routers, hubs, and switches are networking devices that control the flow of data between different networks or processing nodes. Firewalls are hardware devices and/or software applications which enforce a security policy on network traffic to protect a network and its internal devices, such as servers and databases, from unwanted or forbidden communications. A database may consist of a collection of high capacity disk drives each connected and managed by a database server providing database accessing functions.

The check in system 100 comprises a plurality of customer environments, such as remote site environment 102, business environments, such as, airline environment 104, and a centralized data center 106. A customer environment may suitable represent a hotel, a shopping mall, a bank, a college or university, a store, such as a coffee shop, or the like where a kiosk device may be placed. A business environment which may make use of a remote site device, such as a kiosk, may suitable represent a transportation related business, such as, airlines, trains, busses, trucking, boating, taxis, car rental businesses of the like. Other examples of business environments, which may make use of a remote site device, include hotels, restaurants, florists, catalog businesses or the like. A kiosk, such as remote kiosk 108, in accordance with the present invention, is a self-service device for electronically interacting with a user of the check in system 100. A kiosk is a processing system with one or more processors, memory, input/output units, such as, disk drives and high speed communication devices, and typically has a keyboard, a display, and a printer.

An airline environment represents an airline provider network of services and facilities tailored to an airlines's requirements. The exemplary airline environment 104 includes, for example, a local network, such as, an airlines's internal wide area network (WAN) 110 connected to airline production servers 112, airline reservation host servers 114, airline kiosks, such as, airport kiosk 116, and to an airline virtual private network (VPN)/dedicated circuit (DC) router 118. The airline VPN/DC router 118 is connected to airline network infrastructure 120 which provides customer specific support for networking interfacing to connect to the Internet 122 of a DC network 124.

The remote kiosk 108 shown in the check in system 100, is a representative example, of a plurality of kiosks used in an actual check in system implementation. A kiosk can be tailored to provide functions, such as, passenger reservations, airline check in, hotel reservation and check in, rental car reservation and pickup and can be located in any environment that is conducive for its intended functions, such as, checking in passengers for airline flights.

The remote kiosk 108, deployed in a hotel or other off airport location, may suitably have one or more common use self service airline check in applications (Apps) running, such as, remote site self service App 126 connected to any network, such as the remote site network 128, which is outside the airline's internal WAN 110. This remote site network 128 is generally not a secure environment which prevents the self service App 126 from operating as it would in a secure airline network. The self service App 126 may be supplied by an airline and may be the same application that runs on the airport kiosk 116 in the airline's wide area network 110. the self service App 126 may also be supplied from a source not directly associated with an airline.

The self service App 126 communicates with a self service control application (App) 130 via the CUSS 1.1 standard Specification and Common Object Request Broker Architecture (COBRA) interface both of which are incorporated by reference in their entirely. The self service control App 130 in turn provides a self service thin client services (TCS) platform 132 with functions, such as, printing and reading input devices, such as, a credit card reader or a barcode scanner, and managing software version updates. The self service App 126 is controlled by a self service common launch application (CLA) 134. The self service CLA 134 starts various applications, such as the remote site self service App 126, based on configuration information retrieved over the Internet 122 via a hyper text transfer protocol over secure socket layer (HTTPS) from a central platform services application 136 running on a centralized server 137.

The configuration information defines which business applications are applicable to run on a specific kiosk, are initially specified by the business service provider, and communicated to the centralized data center 106. For example, a kiosk deployed in one city may run different airline applications based on what airlines serve that city, than a kiosk in another city. The configuration information returned to the self service CLA 134 specifies the information, such as, applicable airlines appropriate for a particular kiosk. Configuration information, which may also include software version updates, is typically provided from the centralized data center 106 on kiosk startup and on a periodic basis thereafter.

An administration tool (Admin Tool) 138 is a web tool which allows for the configuration of the remote kiosk 108 and the self service App 126 using the configuration and status database (Config/Stats DB) 139 located in the centralized data center 106. Configuration information includes selection of airline applications that are to be available on specific kiosks, application sleep times, and airline specific kiosk names. For example, a kiosk at a hotel in Atlanta could be configured to allow guests to check in to airlines A, B, C, D, and E using self service applications provided by the airlines A, B, C, D, and E. A kiosk in Denver could be configured to allow guests to check in to airlines, B, C, E, F, and G using self service applications provided by those airlines. Each kiosk generally can run applications from all airlines, but usually is configured for airlines that service the area where the kiosk is located. Further examples of configuration information for a remote kiosk, such as the remote kiosk 108,are provided with regard to FIGS. 4 and 5 below.

Through information provided by the Admin tool 138 accessed from the Config/Stats DB 139, the self service common launch application (CLA) 134 can control sleep times and names for the kiosks for use by airline production servers, as may be required by an airline having a naming convention. The sleep time is the time an application is not available as defined by the airline, which also indicates the time the applications are generally available. For example, an airline application may be disabled for several hours during the night. This information is stored in the Config/Stats DB 139 in a airline specific section in the centralized data center 106. The self service CLA 134 requests this information from the Config/Stats DB 139 via the central platform services application 136 to determine which application to run and display as available at specific times during the day. The self service CLA 134 also reports usage statistics back to the database Config/Stats DB 139, such as, the number of times a guest initiates the airline application, how long was the airline application in control, and the like.

The self service App 126, as supplied by an airline and by means of the secure information flow of the centralized data center 106, advantageously provides a set of functions at a remote site kiosk that typically are only provided by a business from within its own operating environment. For example, the self service App 126 may provide the following features:

Find a reservation by credit card, guest name on a credit card and a destination city, frequent flyer card/number, and confirmation number.

Multi-party check in with or without bags

Auto seat assign/change seat

View itinerary, including customer names, frequent flyer information, flight details, seats, or the like Upgrades complimentary (frequent flyer) and/or paid Flight changes complimentary (unrestricted fares), flat fee, ticket reissue Add or change frequent flyer information Boarding pass and receipt printing When an airline passenger, considered a guest in the customer environment, initiates use of the remote kiosk 108, the self service CLA 134 presents a list of airlines for which the guest can check in on. When the guest selects an airline from the touch screen, the self service CLA 134 will transfer control to the specific self service application for the selected airline. The guest will then interact with the airline's self service application for the check in transaction. As an example, the self service App 126, in the course of processing the transaction, will communicate with a production server in the airline environment, outside of the airline environment 104, communication is done over the Internet 122 through the centralized data enter 106. The self service App 126 communicates with a tunnel endpoint 140 running locally on the remote kiosk 108. This tunnel endpoint 140 emulates interactions with the airline production servers 112. The self service App 126 is configured to send traffic to the tunnel endpoint 140 instead of the airline production servers 112. Generally, the self service App 126 communicates with the tunnel endpoint 140 in the same manner as the airport kiosk 116 communicates with the airline production servers 11.

The tunnel endpoint 140 provides services, such as, compressing application information to adapt to lower speed networks since, for example, the kiosks can be deployed in environments where network bandwidth might be an issue. The tunnel endpoint 140, in the check in system 100, connects to a tunnel endpoint 142 running on the centralized server 137 using an encrypted secure socket layer (SSL) protocol. The centralized server 137 resides in the centralized data center 106 behind a firewall 144. The tunnel endpoint 142 running on the centralized server 137 routes communication traffic from remote kiosks to the airline production severs 112.

The airline provided self service application is changed to provide the redirection of their server IP address(es)/port(s) from servers at their airline environment or other hosting location to a localhost (loopback) address/port on the kiosk. Localhost is a self reference to the local kiosk. For most airline applications, this may be achieved by changing a URL for a web-based application or an IP/Port configuration in a text file. In some instances, a redirection address can be changed by changing the local "hosts" file on the kiosk to point to the localhost (loopback) address on the kiosk. The hosts file is a file stored on a kiosk which contains a list of known machine names and is generally used to look up and Internet protocol address of a device. For example, when the name of the machine is entered, such as in a web browser, the browser checks the hosts file first to see if there is a name-to-IP address translation. If none is found, the query is sent to a local Domain Name Service to translate the name.

As an example, for "XYZAirlines", with a web-based application hosted on a private network at URL http://checkin.xyzairlines.com/KioskCheckin, the present invention provides a number of approaches to supports this web-based application, For example, in a first option, an entry to the system hosts file, such as C:/WINDOWS/system32/drivers/etc/hosts on WindowsXP, is added to map checkin.xyzairlines.com to localhost at 127.0.0.1. The hostname name localhost by convention maps to the IP Address 127.0.0.1. In a second option, the XYZAirlines changes the application configuration to be installed on a remote kiosk to point to URL http://localhost/kioskcheckin:xxxx, where xxxx is an IP port number defined by the centralized data center 106.

In addition to supporting the web-based application, a tunnel endpoint is set up. In a first step, a tunnel endpoint, such as tunnel endpoint 140, on a remote site kiosk, such as the remote kiosk 108, is set up to receive incoming requests from an airline application. The application running on the remote kiosk, such as self service App 126 communicates with the tunnel endpoint 140 by opening an Internet protocol (IP) connection to "localhost". The tunnel endpoint 140 running on the remote kiosk 108, the local box, and is using Internet protocol to communication with the tunnel endpoint 140 rather than over a network. It is noted that localhost is sometimes referred to as local loopback in that requests destined for the network are looped back to the localhost.

In a second step, a tunnel endpoint, such as tunnel endpoint 142, is set up on the centralized server 137 to point to the real application address at http://checkin.xyzairlines.com/kioskcheckin. The tunnel endpoint 142 on the server side would send a request coming from the tunnel endpoint 140 to the destination the request was originally meant to go to. When the address of the remote kiosk application is changes from xyzairlines.com to localhost, the server side is updated wit a corresponding change such that requests from remote kiosks may be forwarded to the proper destination, such as xyzairlines.com. Because the tunneling endpoint application is compatible with the HTTP protocol, it can handle multiple applications mapped to the standard HTTP port 80. When a URL is entered into a browser, such as http://google.com, the local system automatically attempts to connect on TCP/IP port 80 (HTTP Standard). Multiple applications are distinguished one from another based on information contained in the URL that was received. For example, two airlines may use a similar URL with the exception of the host name, for example, http://checkin.xyzairlines.com/checkin and http://kioskcheck.abcairlines.com/checkin. Once these addresses are both redirected to localhost at 127.0.0.1, they will hit the same port on the kiosk. Because the tunneling endpoint software is compatible with the HTTP protocol, it can still redirect the traffic over the correct tunnel by looking at the URL specified. There are a variety of methods the tunnel endpoint on the remote kiosk may use to redirect the traffic. If the "hosts file" has been changed to redirect communications, then the tunnel endpoint may examine the protocol request. If the application is pointed to localhost, and the "hosts file" is not changed, then the application would be configured to use a different port, other than port 80, for the tunnel endpoint on the remote kiosk, but the tunnel endpoint on the server can still send the request to port 80 at the destination.

In the case of a proprietary protocol used by a non-web application, if there are port number conflicts caused by two applications, for example, that needed to use the same port number, then the second option addressed above may be used to have the airline change the application configuration to point to a specific port on the localhost. An advantage of using either the first option, the second option, or both is that the information processing is done in the centralized data center 106. No changes generally have to be made to the airline environment 104. For example, airline communication traffic is a result of a kiosk requesting data from the airline environment. The airline communication traffic is due to pulling data to the kiosk and not "pushing" data to the kiosk. To provide a secure environment for the airlines, an airline demilitarized zone (DMZ) 146, a secure sub-network, is located behind firewalls 148 and 150 and provides an airline network environment to route communication traffic through. A DMZ may be provided for each airline supported by the centralized data center 106. The general requirement being the use of a dedicated circuit or VPN to the airline environment. The flow of information to an airline environment is from a kiosk, such as the remote kiosk 108 in the remote site environment 102 to the centralized data center 106 to the airline environment 104. The flow of information returning to the kiosk is from the airline environment 104 to the centralized data center 106 to the remote kiosk 108. The information traffic is routed to the appropriate airline and customer environment in a secure manner using two firewalls, such as firewall 148 to protect the centralized server 137 and firewall 150 to protect the DMZ sub-network from the Internet. The information traffic is then routed to the appropriate airline and customer environment via either a VPN or dedicated circuit (DC) facilitated by a router 152, for example.

Referring to FIG. 1, all data requests and data transfers involving remote kiosk 108, follow the data path beginning at the remote kiosk 108 and following through tunnel endpoint 140, tunnel endpoint 142, through the airline DMZ 146 to airline network infrastructure 120, to the airline production servers 112. For example, the airline production servers 112 receive a request for information from the kiosk device 108 as routed through the centralized data center 106. This request initiates a flow of information between the kiosk remote site self service App 126 and the airline production servers 112, that is processed by the production servers 112. In turn, the production servers 112 may involve their airline reservation host sever 114, if applicable. The processing on these servers 112 and 114 may be considered proprietary to the airline according to their business logic. Requests made to the airline production servers 112 generally result in some response. Network return traffic is routed back via a reverse of the above method.

As indicated above, the centralized data center 106 provides a path for connecting a self service application with an airline production and reservation system. An advantage of such a path is encryption and available compression support provided by the tunnel endpoints 142 and 140 between the centralized data center 106 and the self service applications, such as self service App 126, respectively, in a customer environment over the very public Internet. The centralized data center 106 also provides a common endpoint for a remote kiosk to direct traffic to various airlines. For example, a single centralized server 137 may service many remote kiosks acting as a common endpoint for the remote kiosks. All of the kiosks talk to one endpoint. There can also be multiple airline environments.

Figure 2:
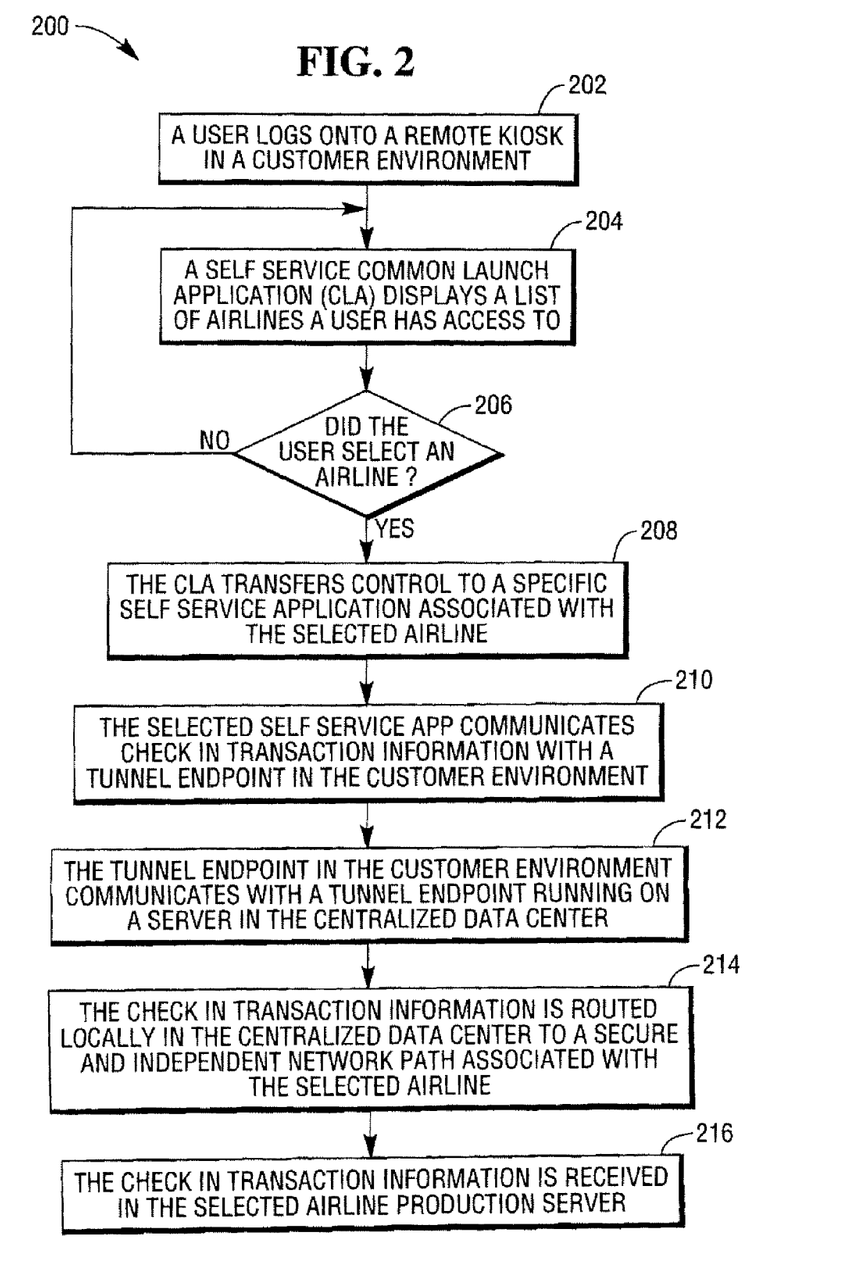
FIG. 2 illustrates an information flowchart of a process of information flow between a kiosk, a centralized data center, and an airline environment in accordance with one aspect of the present invention.

FIG. 2 illustrates an information flowchart of a process 200 of information flow between a kiosk, a data center, and an airline environment in accordance with one aspect of the present invention. The process 200 begins when a user logs onto a remote kiosk, such as remote kiosk 108, in a customer environment in step 202. A customer environment may suitably represent a hotel, a shopping mall, a bank, a college or university, a store, such as a coffee shop, or the like where a remote kiosk device may be placed. In step 204, a self service common launch application (CLA), such as self service CLA 134, displays a list of airlines a user has access to. In decision step 206, it is determined whether the user selected an airline. If the user did not select an airline, the process returns to step 204 where the airline list is displayed. Further prompts may be displayed if no action is taken by the user in a set time period. If the user did select an airline, then the process proceeds to step 208. In step 208, the CLA transfers control to a specific self service application associated with the selected airline, such as self service App 126. In step 210, the selected self service application communicates check in transaction information with a tunnel endpoint, such as tunnel endpoint 140, in the customer environment. In step 212, the tunnel endpoint in the customer environment communicates with a tunnel endpoint, such as tunnel endpoint 142, in the centralized data center 106. In step 214, the check in transaction information is routed locally in the centralized data center 106 to a secure and independent network path associated with the selected airline. In step 216, the check in transaction information is received in a selected airline production server, such as airline productions servers 112.

Figure 3:
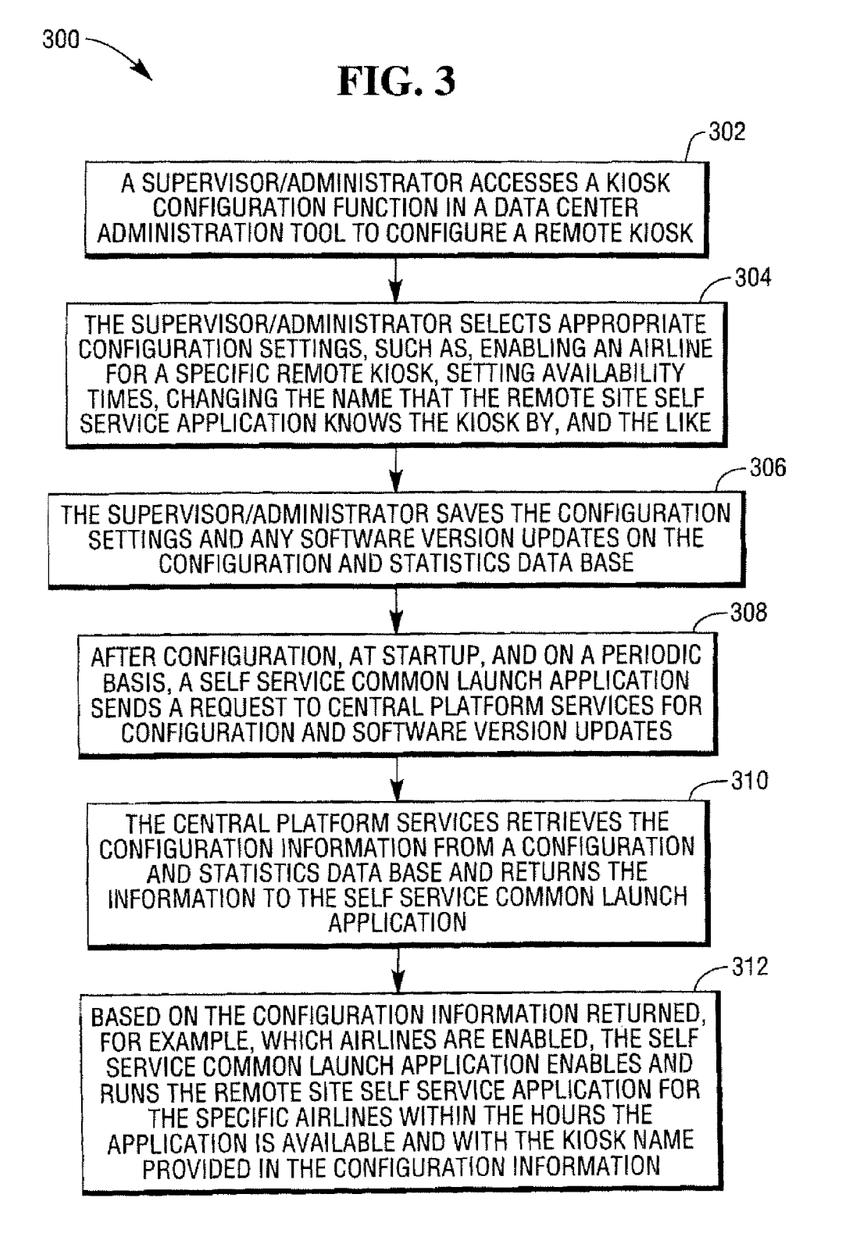
FIG. 3 illustrates a configuration flow chart for advantageously configuring a remote site kiosk in accordance with an aspect of the present invention.

FIG. 3 illustrates a configuration flowchart 300 for advantageously configuring a remote site kiosk, such as remote kiosk 108, in accordance with the present invention. In step 302, a supervisor/administrator accesses a kiosk configuration function in a data center, such as the centralized data center 106, using an administrative tool, such as the administration tool 138, to configure the remote kiosk. In step 302, the supervisor/administrator selects an appropriate configuration setting, such as, enabling an airline on the remote kiosk, setting the availability times, changing the name that the remote site self service application knows the kiosk by, and the like. In step 306, the supervisor/administrator saves the configuration settings and any software version updates on a configuration and statistics data base, such as Config/Stats DB 139. In step 308, after configuration, at startup, and on a periodic basis, a self service common launch application (CLA), such as self service CLA 134, sends a request to the central platform services 136 for configuration and software version updates. In step 310, The central platform services 136 retrieves the configuration information from the configuration and statistics data base 139 and returns the information to the self service CLA 134. In step 312, based on the configuration information returned, for example, which airlines are enabled, the self service CLA 134 enables and operates the remote site self service App 126 for the specified airlines within the hours the application is available for the specific airline and with the kiosk name provided in the configuration information.

Figure 4:
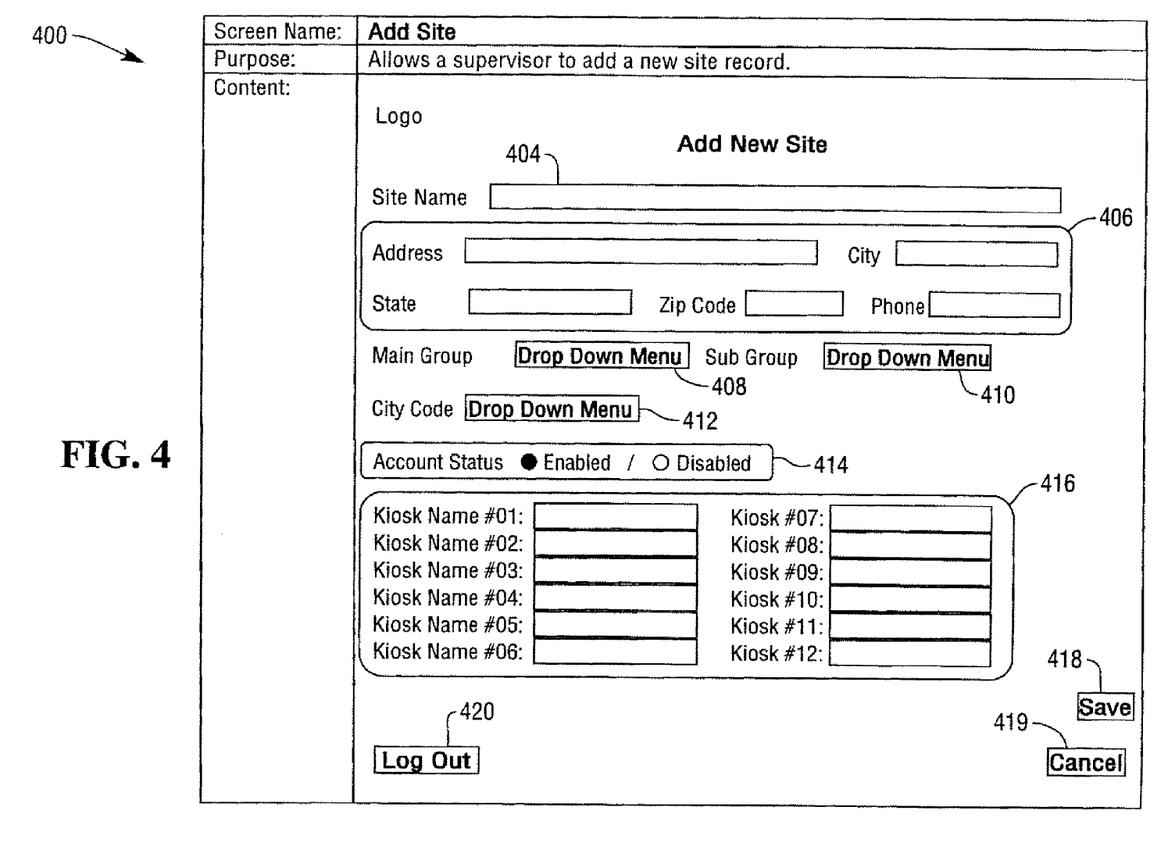
FIG. 4 illustrates an add new site entry screen for adding a remote site to the system and setting it up for multiple kiosks in accordance with an aspect of the present invention.
Figure 5:
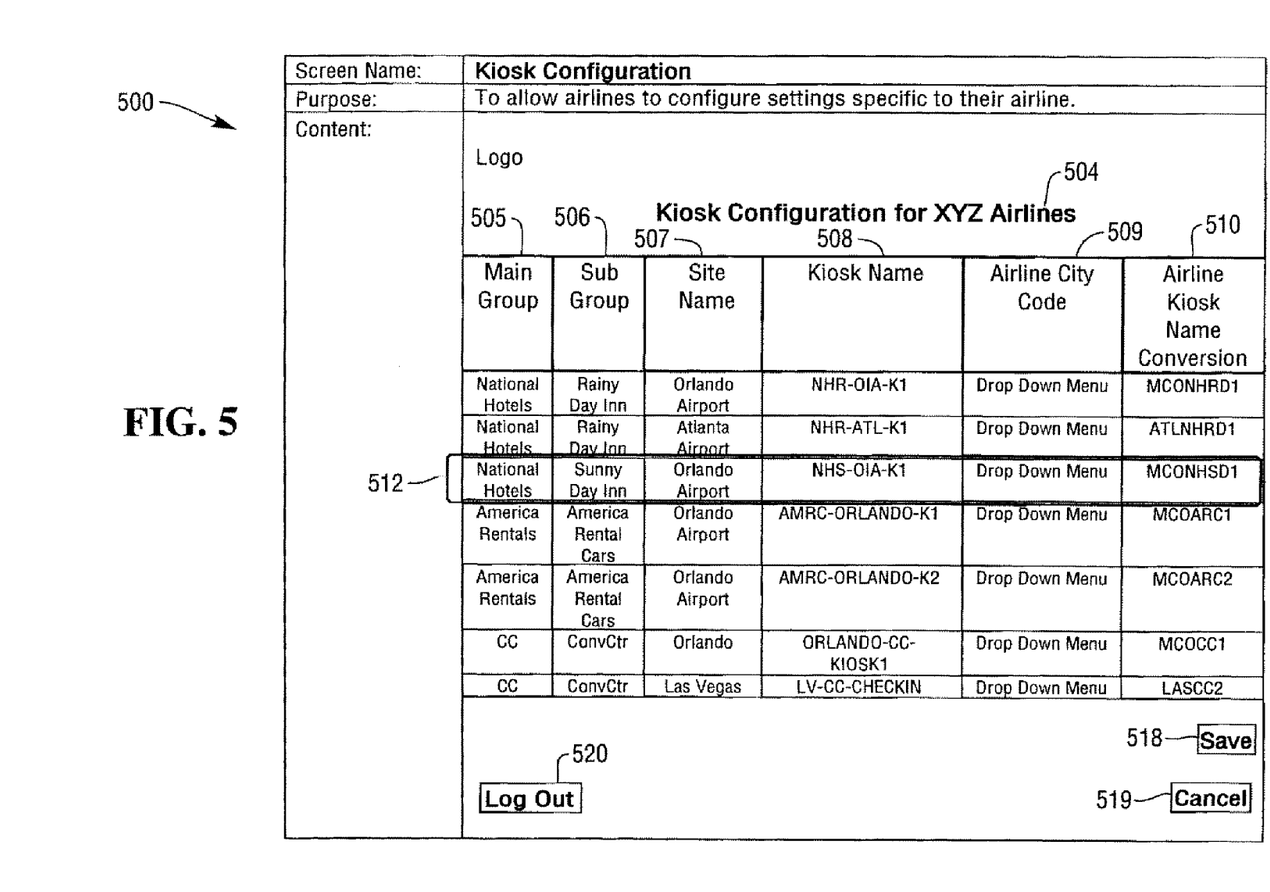
FIG. 5 illustrates a personalized kiosk configuration entry screen to configure a set of kiosks to the personal information of an airline service provider in accordance with an aspect of the present invention.

FIGS. 4 and 5 illustrate examples of the entry screens that may suitably be part of the administration tool 138 of FIG. 1. FIG. 4 illustrates an exemplary add new site entry screen 400 for adding a remote site to the system and setting it up for multiple kiosks in accordance with an aspect of the present invention. The add new site entry screen 400 is used by an authorized person, such as an airline supervisor or administrator that is responsible for administering remote sites 102 of FIG. 1. The supervisor/administrator may suitably employ the administration tool 139 to add or configure a kiosk at a remote location. The add new site entry screen 400 is associated with one of the functions of a main menu used by the administration tool 138. As an example, an airline supervisor/administrator would fill in a site name 404, address information 406, select a main group 408, sub group 410, and city code 412 from the appropriate lists and indicate enabled or disabled status 414 for a set of kiosks 416, such as kiosks 01-12. For example, a site may have a set of kiosks which may be enabled of disabled collectively. Once the information has been filed in, the supervisor/administrator may use the activation buttons 418-420 as illustrated at the bottom of the entry screen. For example, the supervisor/administrator may activate the save button 418 to save the information and return to a main menu. The logout button 420 may be selected to log the user out of the system, cancel any pending transactions, and return to a login screen. By saving the information, a record of the new kiosk or kiosks is entered into the configuration and status database (Config/Stats DB) 139 and the new kiosk or kiosks are then made available for use at the remote site.

FIG. 5 illustrates a personalized kiosk configuration entry screen 500 that is used to configure a set to kiosks to the personal information of a business service provider in accordance with an aspect of the present invention. A supervisor/administrator that is responsible for administering a remote site environment 102, such as for an airline environment 104, may suitably employ the administration tool 138 of FIG. 1 to enable access rights for a remote kiosk, such as the remote kiosk 108, to use the airline network infrastructure 120. The kiosk enabling process includes mapping of the name of the remote kiosk to a naming convention consistent with the airline network. By enabling the access, an airline application on the remote kiosk 108 would then be available for consumer use. Unless enabled, the kiosk will not display the application for the airline. This personalized kiosk configuration entry screen 500 allows he supervisor/administrator to configure the mapping of a kiosk to an airport and machine name. The configuration may generally include the available kiosks, including remote kiosks and airport kiosks 116, if so authorized and enabled for updating by a centralized data center.

For example, to support XYZ Airline, a configuration list 504 is provided. Configuration settings are entered in the configuration list 504 which is made up of six columns 505-510. Kiosks may be personalized to a configuration for XYZ Airline by associating the kiosks with an airport code and name mapping in the remote site environment. An exemplary entry on line entry 512 is illustrated comprising a main group 505 for "National Hotels", a subgroup 506 for "Sunny Day Inn", a site name 507 "Orlando Airport", a kiosk name 508 "NHS-OIA-K1", an airline city code 509 selected from a drop down menu, and an airline kiosk name conversion 510 "MCONHSD1". The airline city code 509 and airline kiosk name conversion 510 are specific entries associated with the airline user currently logged onto the administration tool 138 of FIG. 1. For each airline that uses a kiosk, the configuration information for that kiosk is set up specific for that airline. For example, if the kiosk is in New York City (NYC), then one airline might want to select LaGuardia (LGA) airport and another airline might want select John F. Kennedy (JFK) airport. Additionally, there might be a city code of LGA/JFK for both. This information would be specific to the airline. The airline kiosk name is also specific to the airline.

In a supervisor mode, all airline columns are available for update or entry of new data. Once the information has been filed in, the supervisor/administrator may use the activation buttons 518-520 as illustrated at the bottom of the entry screen. For example, the supervisor/administrator may activate the save button 518 to save the information and return to a main menu. The cancel button 519 may be selected to cancel any pending transaction and return to the main menu. The logout button 520 may be selected to log the user out of the system, cancel any pending transactions, and return to a login screen. By saving the information, records for the specified kiosk are updated in the configuration and status database (Config/Stats DB) 139.

It is noted that as presently embodied, if a kiosk is added by s supervisor/ administrator by using the add new site entry screen 400 aspect of the administration tool 139 of FIG. 1, business self service of the personalized kiosk configuration entry screen 500 aspect of the administration tool 138 of FIG. 1, will selected business self service applications become available to the added kiosk. This two step approach, for example, allows an airline supervisor/administrator to control which applications are run and the environment in which they are run. The airline supervisor/administrator is also able to configure kiosks for their local airports and to provide a desired name mapping.

While the present invention has been disclosed in a presently preferred context, it will be recognized that the present teachings may be adapted to a variety of contexts consistent with this disclosure and the claims that follow. For example, the present invention is disclosed mainly in the context of airline check-in. In will appreciated that it may also be employed with hotel reservations, rental car check-in, some combination of the above, or a wide variety of other self-service kiosk supported applications at the use of such kiosks matures and evolves. It will also be appreciated that variations in the particular hardware and control process employed are feasible, and to be expected as both evolve with time.

We claim:

1. A system for providing self service use of services of a provider network remotely from the provider network, the system comprising:

a remote site kiosk placed in a remote site network with an Internet connection, the remote site kiosk having encryption support via a remote site tunneling endpoint for communications over the Internet and the remote site kiosk having a plurality of self service applications of different service providers, wherein each self service application is configurable to communicate through the remote site tunneling endpoint;

a data center separate from the different service providers, wherein host server interactions of a selected service provider are emulated over secure Internet communications of a reservation transaction between the data center and a corresponding self service application operating on the remote site kiosk, wherein the data center includes encryption support via a data center tunneling endpoint to provide the secure Internet communications of the reservation transaction with the remote site tunneling endpoint; and a host server associated with a selected service provider of the different service providers and having a separate and secure network path with the data center, wherein reservation transaction data is communicated between the host server of the selected service provider and the data center using the separate and secure network path and the reservation transaction data is communicated between the data center and the corresponding self service application on the remote site kiosk via routing through the data center by the data center tunneling endpoint.

2. The system of claim 1 wherein the data center further comprises:

a provider network demilitarized zone (DMZ) interface as a secure and independent communication path associated with the provider network.

3. The system of claim 1 wherein the data center further comprises:

a configuration and statistics database for saving the configuration and software version updates for the remote site kiosk.

4. The system of claim 1 wherein the data center further comprises:

an administration tool which enables mapping of a name for the remote site kiosk to fit a provider network specified naming convention.

5. The system of claim 4 wherein the administration tool also sets availability times for public use of the remote site kiosk.

6. The system of claim 1 wherein the provider network is an airline reservation, ticketing, and check-in network located in an airport.

7. The system of claim 6 wherein the remote site kiosk is located at a business site remote from the airport and the remote site kiosk is utilized by a user to check in for a flight.

8. The system of claim 1 wherein the remote site tunneling endpoint supports emulation of the provider network.

9. A method for providing self service use of services of a provider network remotely from the provider network, the method comprising:
storing, in a remote site kiosk, service provider configuration information associated with transactions between a user and a service provider by the remote site kiosk with an Internet connection, the remote site kiosk having encryption support via a remote site tunneling endpoint for communications across the Internet with a data center and having self service applications associated with different service providers, wherein the self service applications are selectable to communicate through the remote site tunneling endpoint to the data center which communicates to a corresponding service provider;
receiving information from host servers of the different service providers via the Internet connection by the remote site kiosk through a data center separate from the service providers based on the service provider configuration information, with encryption support via a data center tunneling endpoint over the Internet connection for emulation of service provider host server interactions between the remote site kiosk self service applications and the data center; and
sending transaction information to the data center tunneling endpoint over the Internet connection by the remote site kiosk, wherein the transaction information is routed to a host server of the one service provider through the data center tunneling endpoint by the data center.

10. The method of claim 9 wherein the name of the remote site kiosk is mapped to fit a naming convention specified by the one service provider.

11. The method of claim 9 wherein communication between the data center and the one service provider over a provider network's demilitarized zone (DMZ) interface is as a secure and independent communication path associated with the provider network.

12. The method of claim 9 wherein service provider configuration and software version updates are saved for the remote site kiosk on a configuration and statistics database in the data center.

13. The method of claim 9 wherein availability times of use of the remote site kiosk is set by an administration tool of the data center.

14. The method of claim 9 wherein the one service provider is a reservation and ticketing system.

15. The method of claim 9 wherein the remote site kiosk is located at a business site separate from the one service provider and a user uses the remote site kiosk to make reservations for service by the one service provider.

16. The method of claim 9 further comprising:
redirecting an Internet protocol (IP) address of the one service provider from a server at the one entity to a localhost address on the remote site kiosk.

17. A method for providing self service use of services of a business service provider remotely from the business service provider, the method comprising:
communicating service provider configuration and software version control information, including authorized business service providers, by a data center to a self-service computer at a remote site through a tunneling secure network, the data center being remote from the business service provider;
displaying a list of the authorized business service providers by the self-service computer configured to support the authorized business service providers using the service provider configuration and software version control information;
receiving an indication of a selection by a user of one of the authorized business service providers displayed by the self-service computer;
transferring control to a remote site self service application on the self-service computer to support the one business service provider;
initiating a transfer of transaction information associated with a transaction between the user and the one authorized business service provider by the self-service computer;
emulating the one authorized business service provider during interactions between the data center and the self-service computer, wherein the interactions include the transaction information sent between the data center and the self-service computer; and
routing the transaction information to the one authorized business service provider through the tunneling secure network by the data center.

18. The method of claim 17 further comprising:
communicating periodic requests from the configured self-service computer to the data center for service provider configuration and software version updates.

19. The method of claim 18 further comprising:
updating the software version control information associated with the remote site self service application according to the software version updates received from the data center; and updating the service provider configuration information associated with the remote site self service application according to the service provider configuration updates received from the data center.

20. The method of claim 17 further comprising:
mapping a name of the configured remote site self service application to fit the selected business service provider specified naming convention.

* * * * *